United States Patent [19]

Anderson

[11] 4,293,067
[45] Oct. 6, 1981

[54] CONVEYOR ASSEMBLY FOR A WRAPPING MACHINE

[75] Inventor: Andrew W. Anderson, West Caldwell, N.J.

[73] Assignee: Scandia Packaging Machinery Co., Clifton, N.J.

[21] Appl. No.: 54,499

[22] Filed: Jul. 3, 1979

[51] Int. Cl.³ .............. B65G 17/06; B65G 17/38; B65G 29/00; B65G 25/00
[52] U.S. Cl. ................................ 198/851; 198/476; 198/853; 198/655; 198/793; 474/207; 474/209; 474/222
[58] Field of Search ............... 198/476, 850, 853, 837, 198/838, 851, 655, 792, 793, 334; 74/245 R, 245 C, 245 LP, 250 R, 250 C; 403/312, 313, 302; 59/7, 82, 84; 277/211; 474/230, 91; 308/5 R, DIG. 9, 243, 240

[56] References Cited

U.S. PATENT DOCUMENTS

| 932,034 | 8/1909 | Krone | 198/793 |
|---|---|---|---|
| 2,584,134 | 2/1952 | Knutson | 198/851 |
| 2,909,937 | 10/1959 | Williams | 474/91 |
| 3,178,239 | 4/1965 | Zeller | 308/240 |
| 3,234,698 | 2/1966 | Kimblern | 474/230 |
| 3,841,169 | 10/1974 | Bisewski | 74/250 R |
| 3,877,203 | 4/1975 | Anderson | 53/228 |
| 4,143,503 | 3/1979 | Anderson et al. | 198/834 |

Primary Examiner—Robert B. Reeves
Assistant Examiner—Brian Bond
Attorney, Agent, or Firm—Neil F. Markva

[57] ABSTRACT

A longitudinally, self-adjustable linking element is used to form a conveyor assembly for moving an article along a path. The linking element has two end sections, bearings mounted at each end section, and coupling elements for connecting the end sections with respect to each other. The coupling elements are fixedly secured to one of the end sections and shiftingly secured to the other end section. A closed loop conveying apparatus includes the longitudinally self adjustable linking element and rail guide members extend along the length of the conveying apparatus. Sprocket mechanisms are disposed at fixed spaced locations for changing the direction of movement of the conveying apparatus along the path.

30 Claims, 7 Drawing Figures

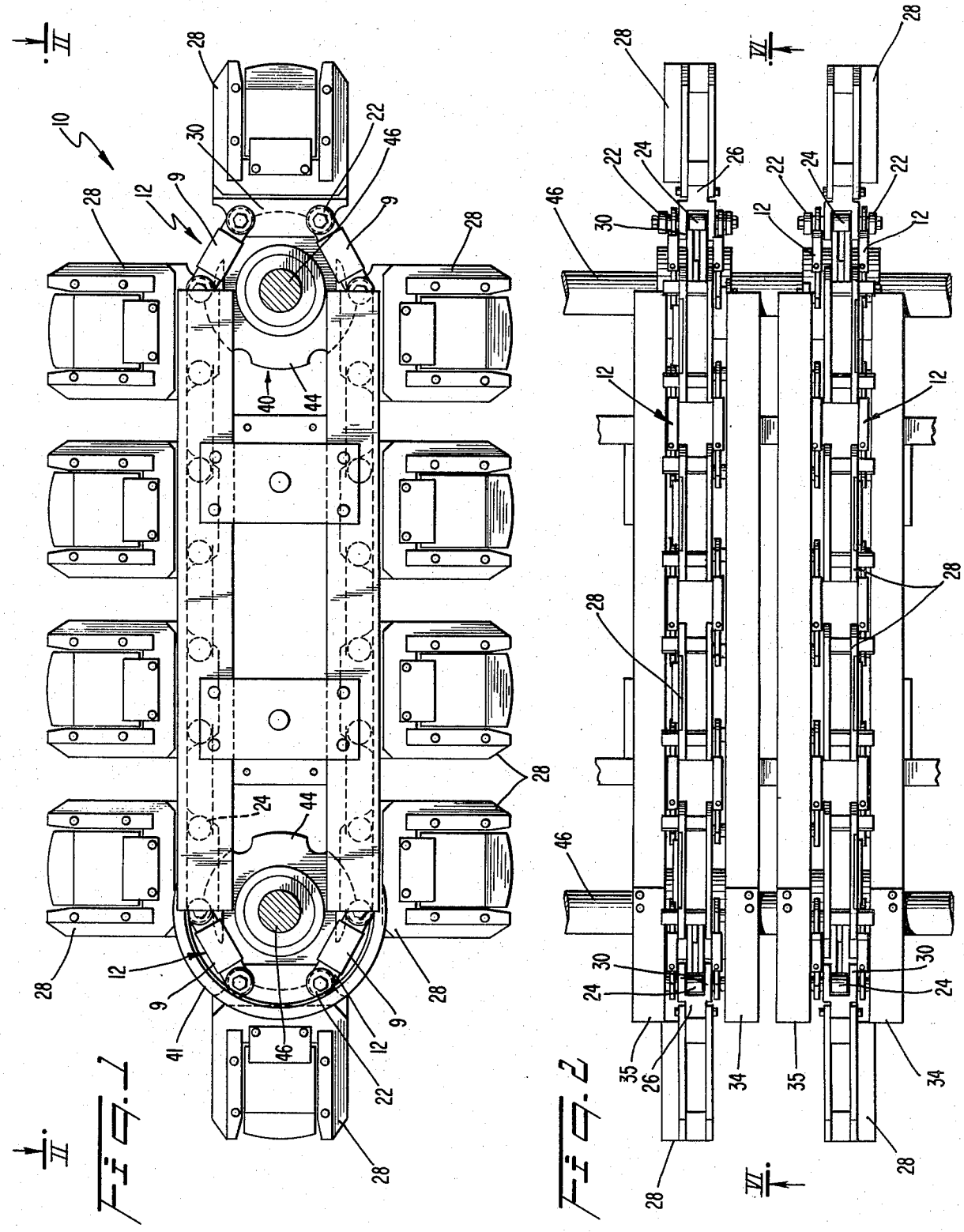

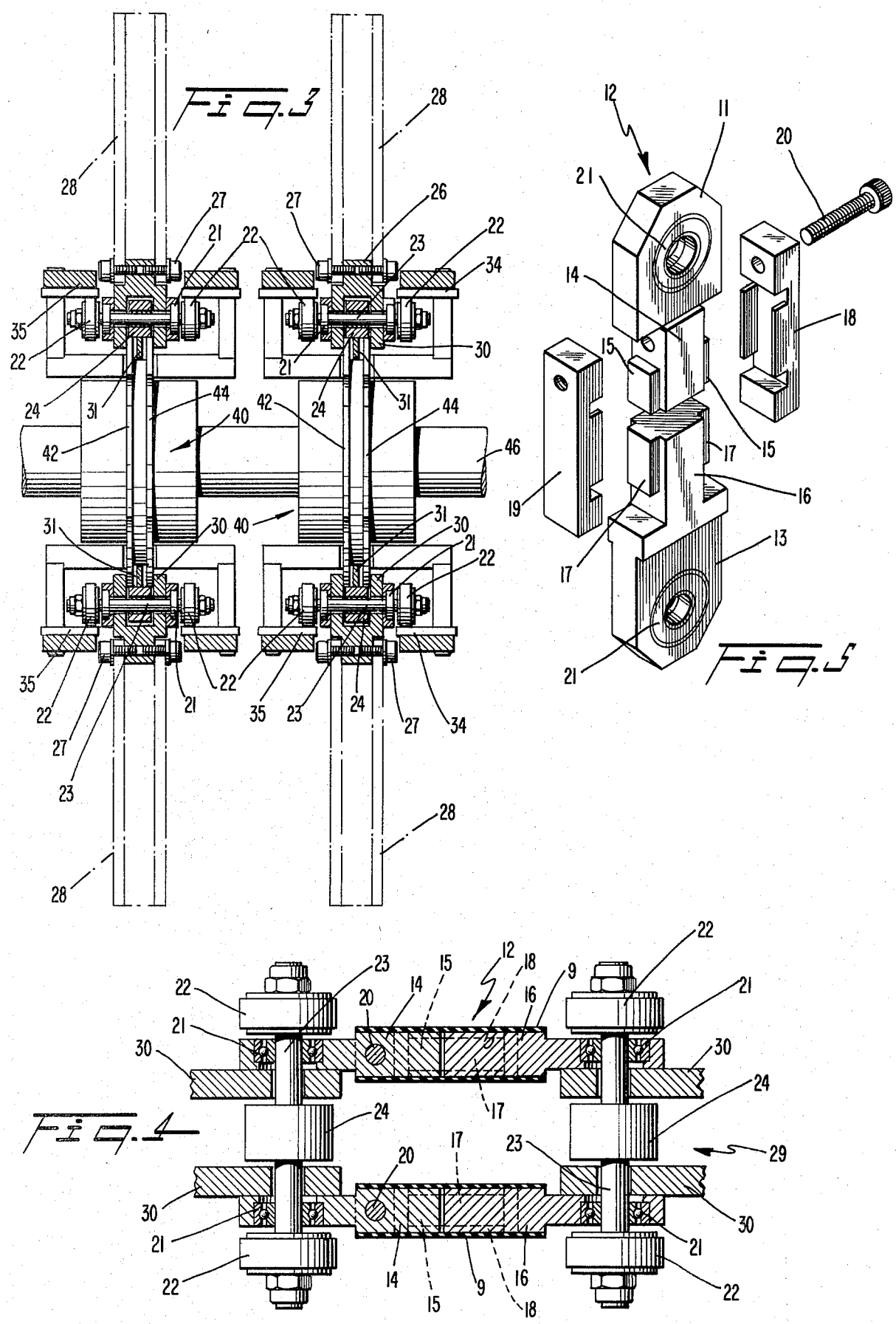

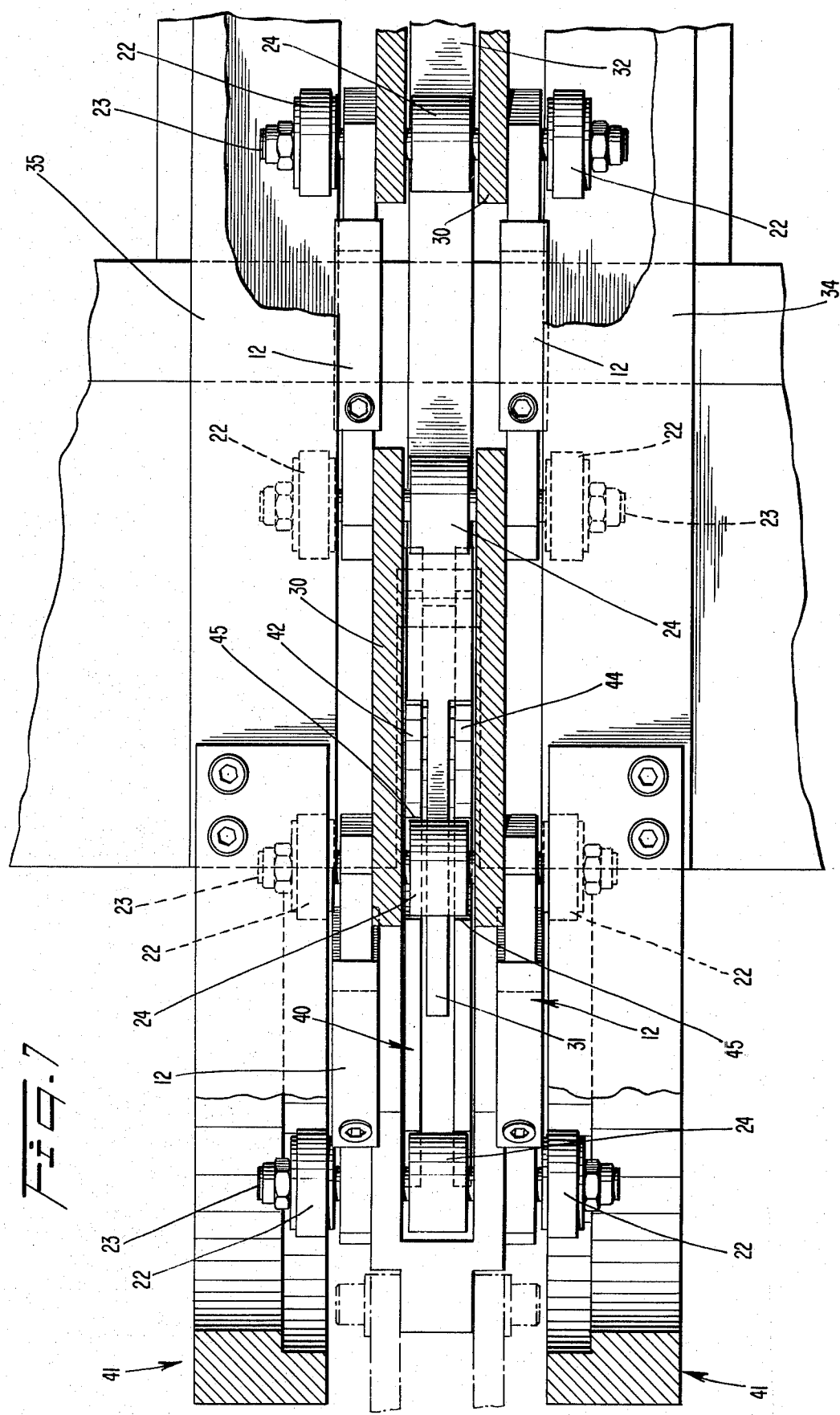

CONVEYOR ASSEMBLY FOR A WRAPPING MACHINE

FIELD OF THE INVENTION

The invention relates to the transporting of articles via a conveyor mechanism having a particular type of conveyor assembly. More particularly, the conveyor assembly is used in combination with a machine for wrapping packages.

BACKGROUND OF THE INVENTION

This invention constitutes an improvement over the assemblies as disclosed in U.S. Pat. Nos. 3,877,203 and 4,143,503. The disclosures of these earlier patents are specifically incorporated herein to further set forth the manner in which the various parts operate with respect to each other.

The wrapping machines in which the present assembly may be moved operate at speeds of up to 200 packages per minute and function on an intermittent basis, thus a working operation is effected at different work stations along the the path of movement for each article. During the moment of time that the packages are stationary at each work station, a separate wrapping function is possible. The use of a conveyor mechanism as set forth in the prior art enables the folding of the wrapping sheet in a flat plane while the article is stationary. This provides a faster and more reliable wrapping function than is presently available in the round turret type wrapper mechanism.

Prior art wrapping machines use the standard conveyor chain to connect carrier blocks for pockets which contain the articles being moved along a path. Wear of the standard chain links due to the stress at the speed of operation has been a continuing problem. Standard sprocket wheels used in prior art machines are designed to be in contact with eack link of the standard chain link conveyor. Because of the nature of the wrapping process, extreme amounts of wear occur on the sprocket and the chain. As the chain moves around the sprocket wheel, the chordal distances is necessarily greater than the length of the chain required to move the pocket members in a flat or linear direction. This continues changing of stresses contributes heavily to the wear and loading on the individual links.

SUMMARY OF THE INVENTION

The conveyor assembly of this invention includes a substantially rigid conveying means which includes a stable and locked disposition of the closed loop conveyor as it passes around sprocket means. A longitudinally, self-adjustable linking member having a fixed longitudinal axis is connected to the carrier block for pocket means moving along a defined path. A sprocket mechanism and rail guide means are incorporated to effect the stable disposition of the pocket members as they change directions along the path carrying the articles being wrapped.

The linking member has two separated linking element end sections, bearing means mounted at each end section, and coupling means for connecting the end sections with respect to each other. The coupling means are fixedly secured to one of the end sections of the linking member and shiftingly secured to the other end section thereof. Sleeve means is disposed over the coupling means to contain lubricant therefor. Inwardly directed connector portions are coupled by two coupling members having an inwardly directed channel for containing bearing surface sections on the connector portions. The slidably connected connector portion is effective to move only a delimited distance parallel to the fixed longitudinal axis of the linking element between a stop abutment on the inwardly directed channel of the coupling member and the end of the other connector portion fixedly secured to the coupling members.

The guide rail means includes a pair of outer elongated rail members, an inner elongated rail member and curved sprocket guide members. The curved sprocket guide is disposed outwardly from and around the circumference of the sprocket wheels located at the ends of the closed loop conveyor mechanism. The inner elongated rail member includes a center portion and two end portions. The end portions have a width sufficient to be disposed between axially spaced sprocket sections to maintain contact with a roller member disposed within an open bottom slot of the carrier block until transferred to the sprocket wheel assembly. The center portion of the elongated rail member between two end sprocket assemblies has a width sufficient to be in sliding contact with the inside surface of the open bottom slot of each carrier block member.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a side elevational view of a conveyor assembly made in accordance with this invention;

FIG. 2 is a top plan view of the assembly as shown in FIG. 1;

FIG. 3 is an end view partly in section of the assembly as shown in FIG. 1;

FIG. 4 is a fragmentary sectional view of a linked combination made in accordance with this invention;

FIG. 5 is an exploded view of a linking element made in accordance with this invention;

FIG. 7 is a fragmentary sectional view along line VII—VII of FIG. 6.

DETAILED DESCRIPTION

Figure 6:
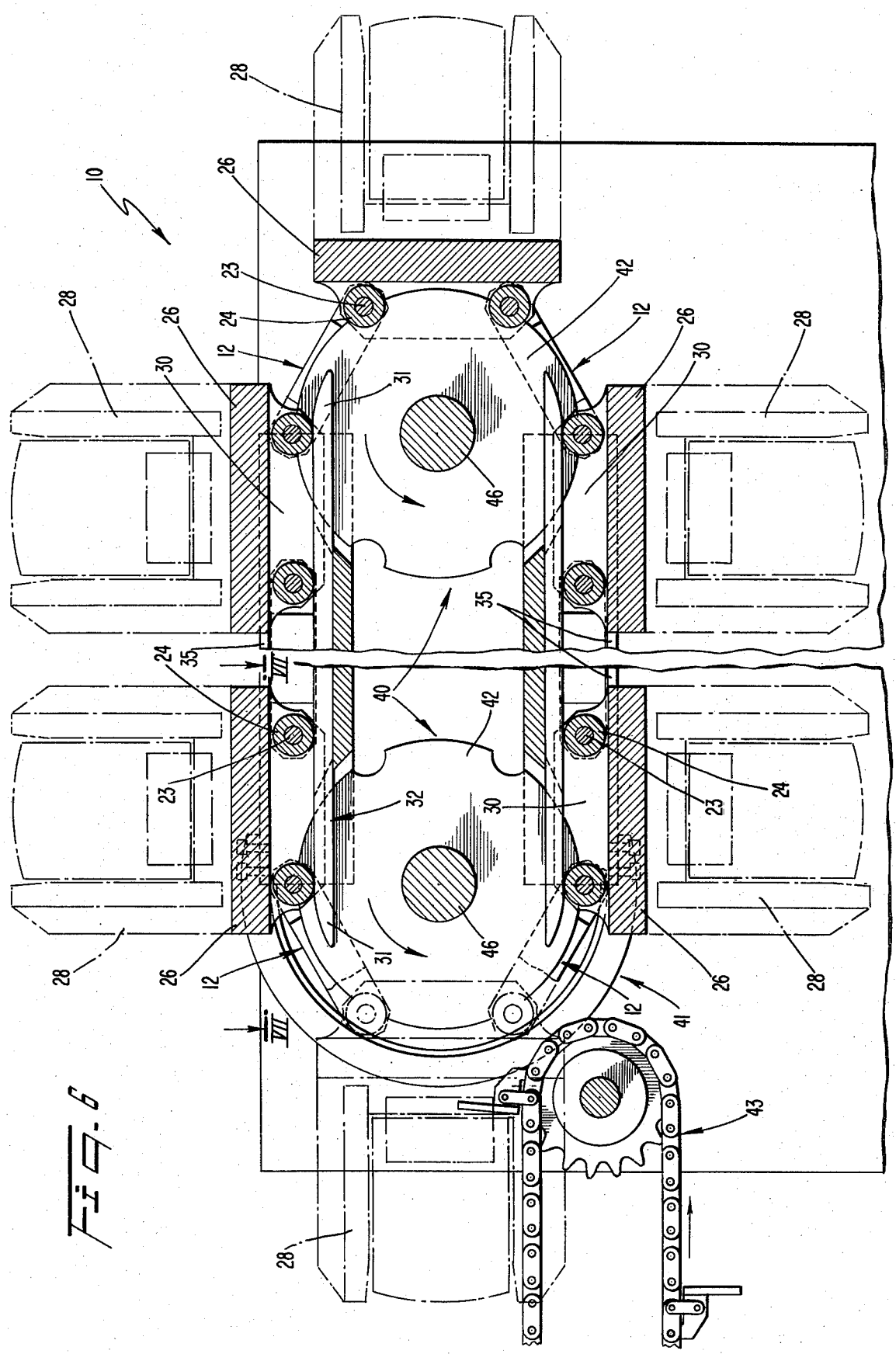
FIG. 6 is a sectional view along line VI—VI of FIG. 2.

The conveyor assembly 10 comprises closed loop conveying means including a pair of conveyor chains each having a plurality of carrier blocks 26 with each adjacent block being interconnected with longitudinally self-adjustable linking elements 12 which, as shown, form a link member having a fixed longitudinal axis. The plurality of carrier blocks have a fixed length alternately connected to the self-adjustable linking elements 12. Sprocket wheels 40 are effective to synchronously move the pair of chains along a defined path to cause carrier blocks 26 of each chain to move along as a unit. Each carrier block 26 carries pocket section 28 to form a pocket means for holding the article being conveyed between the two chains. Sprocket members 40 are located at each of two locations in fixed spaced relationship with respect to each other. Both sprocket members 40 are rotatably driven both of the drive axles 46 to free the closed loop conveyor of any driving function. Conveyor assembly is effective to move the article to a plurality of work stations along the defined path.

Articles are carried within the area contained between the pairs of pocket members or sections 28 in a manner that is well known in the prior art. The adjustability feature of the assembly 10 provides a fixed or rigid disposition of pocket members 28 at the end sections of assembly 10 and includes a floating or breathing section for the conveying means for the pocket members 28 located between the end sections. That is, as the adjustable linking elements 12 are in their maximum extended position when moving around sprocket wheels 40. Thus, pocket members 28 are firmly held in a stable locked disposition across each sprocket wheel location. This function is due to the larger chordal distance that exists as pocket members 28 change direction at each end of conveyor assembly 10. On the other hand, linking elements 12 adjust automatically to the shorter distances between pocket members 28 along the flat sections of assembly 10.

In FIG. 5, linking element 12 includes two end sections 11 and 12 having bearings 21 mounted only on outer opposed ends as shown. Each end section 11 and 13 includes an inwardly directed connector portion 14 and 16, respectively. Each connector portion 14 and 16 has inner opposed ends including respective bearing surface sections 15 and 17. Two coupling members 18 and 19 are fixedly secured to connector portion 14 via bolt 20 and are effective to slidably contain the other connector portion 16. As shown, each coupling member 18 and 19 has an inwardly directed channel which contains bearing surface sections 15 and 17 when sections 11 and 13 are interconnected.

Bearing surface sections 15 and 17 have a width sufficient to be in contact with the inside surfaces of the linking member channels. The length of bearing surface sections 17 is sufficient to provide a longitudinal movement of end section 13 with respect to end section 11. That is, the end face of the connector portion 16 is limited in its movement by contact with the end face of end section 11. Movement of section 13 in the other direction away from end section 11 is limited by the stop abutment located at the slidably connected end of the channels in coupling members 18 and 19.

The amount of movement effected between end sections 11 and 13 is sufficient to compensate for the chordal distances along the sprocket members 40. This, of course, will change in specific length depending upon the size of sprocket members 40. In this specific embodiment the relative movement between end sections 11 and 13 is about 0.006 inch. Thus, the slidably connected connector portion 16 is effective to move only a delimited distance parallel to the fixed longitudinal axis of end sections 11 and 13, as shown, between the stop abutment located at the end of each channel in coupling members 18 and 19 and the end of connector portion 14.

As shown in FIG. 4, a single tubular member 9 composed of a flexible material is disposed over the coupling means to contain lubricant therefor. The flexible material must be a lubrication proof material such as Neoprene.

The interconnection between each linking element 12 and the carrier blocks 26 provide a lateral three point support for the conveying means. The closed loop conveying means of assembly 10 includes a plurality of carrier blocks 26 with each adjacent block being interconnected with the adjustable linking element 12. A pair of linking elements 12 is attached to each end of carrier block 26 by a link pin 23. Each link pin 23 carries a roller member 22 at each outer end thereof. Roller members 22 are effected to maintain rolling contact with rail guide means which extend along the length of the conveying means. Each carrier block 26 has an open bottom slot 29 defined between outer longitudinal wall sections 30 having opposed openings for disposition of each link pin 23. A third roller member 24 is carried by link pin 23 within bottom slot 29.

Rail guide means of assembly 10 include two outer elongated rail members 34 and 35 and an inner elongated rail member 32. Rail members 32, 34, and 35 are parallel with respect to each other and extend along the length of the conveying means. Each roller member 22 at the end of link pins 23 is in upwardly directed rolling contact with respective outer rail members 34 and 35. The third roller member 24 is in downwardly directed rolling contact with inner rail member 32. Thus, the lateral three point support contact is effected through a vertical plane extending through the longitudinal axis of link pin 23. Bearings 21 provide both stability and increased life compared to the conventional chain linkages used in the prior art.

Each sprocket member or wheel 40 includes two axially spaced sprocket sections 42 and 44 and entrainment means constituted by recesses 45 for entraining slot roller member 24 as the conveying means changes direction. Recesses 45 are circumferentially spaced around each sprocket wheel 40 and profiled to contain the roller member 24 mounted on link pin 23 interconnecting each linking element 12 and carrier block 26.

The inner guide rail member 32 includes a center portion extending between sprocket wheels 40 at each end of the moving assembly 10. Two end portions 31 of rail member 32 have a width sufficient to be disposed between axially spaced sprocket sections 42 and 44 which form sprocket wheels 40. The slot roller member 24 located between walls 30 of each carrier block 26 maintains contact with end portions 31 until transferred to entrainment means constituted by recesses 45 in the sprocket sections 42 and 44. The center portion of rail member 31 has a width sufficient to be in sliding contact with the inside surfaces of wall sections 30 within open bottom slot 29 of each carrier block 26. This configuration thus provides further stability to carrier block 26 as it moves intermittently along the path defined for the articles being acted upon.

A curved sprocket guide rail member 41 is disposed at the ends of outer guide rail members 34 and 35. Member 41 is in rolling contact with roller members 22 while roller members 24 are in contact with recesses 45. This ensures the desired stable disposition of extended linking elements 12.

While the conveyor assembly for a wrapping machine has been shown and described in detail, it is obvious that this invention is not to be considered as being limited to the exact form disclosed, and that changes in detail and construction may be made therein within the scope of the invention, without departing from the spirit thereof.

I claim:
1. An assembly for moving an article along a path, said assembly comprising:
   (a) closed loop conveying means including longitudinally self-adjustable link means having a fixed longitudinal axis,
   (b) rail guide means extending along the length of the conveying means,

(c) said link means including a linking element having two end sections with each said end section having an inwardly directed connector portion, bearing means mounted on each end section, and coupling means for connecting said inwardly directed connector portions with respect to each other, (d) said coupling means fixedly secured to one of the inwardly directed connector portions and shiftingly secured to the other inwardly directed connector portions to cause the end sections to be movable only in a direction parallel to the fixed longitudinal axis of the link means, and (e) sprocket means disposed at a location for changing the direction of movement of the conveying means along said path.

2. An assembly as described in claim 1, wherein a sleeve means is disposed over the coupling means to contain lubricant for the coupling means.

3. An assembly as described in claim 2, wherein the sleeve means is a single tubular member composed of a flexible material.

4. An assembly as described in claim 3, wherein the flexible material is a lubrication proof rubber.

5. An assembly as described in claim 1, wherein the coupling means includes two coupling members fixedly secured to one connector portion and effective to slidably contain the other connector portion.

6. An assembly as described in claim 5, wherein
each coupling member has an inwardly directed channel, and
each connector portion has a bearing surface section disposed in the channel.

7. An assembly as described in claim 5, wherein
fastening means fixedly secure the two coupling members to one connector portion, and
each coupling member has an inwardly directed channel with a stop abutment at the slidably connected end thereof,
each connector portion has a bearing surface section disposed in the channel.

8. An assembly as described in claim 7, wherein the slidably connected portion is effective to move a delimited distance between said stop abutment and the end of said one connector portion fixedly secured to the coupling members.

9. An assembly as described in claim 1, wherein the closed-loop conveying means includes a plurality of carrier blocks with each block being pivotally interconnected with an end section of said adjustable link means.

10. An assembly as described in claim 9, wherein sprocket means are disposed at two locations of a change of direction of the conveying means, p1 the guide rail means includes an elongated rail member extending along the length of the conveying means between the two sprocket means,
a link pin interconnects said adjustable link means to said carrier block,
each carrier block has an open bottom slot which slidingly engages said elongated rail member, and
said link pin carries a slot roller member located within said carrier block slot and in rolling contact with said elongated rail member.

11. An assembly as described in claim 10, wherein each sprocket means includes two axially spaced sprocket sections and entrainment means for entraining said slot roller member as the conveying means changes direction.

12. An assembly as described in claim 11, wherein the elongated rail member includes a center portion and two end portions, said end portions having a width sufficient to be disposed between the axially spaced sprocket sections to maintain contact with said slot roller member until transferred to said entrainment means
said center portion having a width sufficient to be in sliding contact with the inside surfaces of said open bottom slot.

13. An assembly as described in claim 9, wherein
said rail guide means includes two outer elongated rail members and an inner elongated rail member,
said rail members being parallel with respect to each other and extending along the length of the conveying means,
a link pin interconnects said adjustable link means to said carrier block having an open bottom slot which slidingly engages said elongated rail member,
said link pin carries a roller member at each other end thereof and a third roller member located within said bottom slot,
said third roller member being in downwardly directed rolling contact with the inner rail member and said outer end roller members being in upwardly directed rolling contact with respective outer rail members.

14. An assembly for moving an article along a path, said assembly comprising:
(a) closed loop conveying means including longitudinally self-adjustable link means,
(b) rail guide means extending along the length of the conveying means,
(c) said link means including a linking element having two end sections, bearing means mounted on each end section, and coupling means for connecting said end sections with respect to each other,
(d) said coupling means fixedly secured to one of the end sections and shiftingly secured to the other end section,
(e) sprocket means disposed at a location for changing the direction of movement of the conveying means along said path,
(f) the closed-loop conveying means including a plurality of carrier blocks,
(g) each said interconnecting link means including a pair of said linking elements attached to a carrier block at each end thereof by a link pin,
(h) each said link pin carries a roller member at each outer end thereof,
(i) said roller member being effective to maintain rolling contact with said rail guide means.

15. An assembly as described in claim 14, wherein
each carrier block has an open bottom slot defined between outer longitudinal wall sections having opposed openings for disposition of each said link pin,
each said link pin carries a third roller member within said bottom slot,
said third roller member being in contact with said sprocket means during movement of said conveying means.

16. An assembly as described in claim 15, wherein
said guide rail means includes curved sprocket guide members,
said outer end roller members being in rolling contact with said curved sprocket guide when said third roller member is in contact with the sprocket means.

17. An assembly as described in claim 14, wherein the sprocket means includes a sprocket wheel having circumferentially spaced recesses profiled to contain a roller member mounted on the link pin.

18. An assembly for moving an article along a path, said assembly comprising:
(a) closed loop conveying means including longitudinally self-adjustable link means,
(b) rail guide means extending along the length of the conveying means,
(c) said link means including a linking element having two end sections, bearing means mounted on each end section, and coupling means for connecting said end sections with respect to each other,
(d) said coupling means fixedly secured to one of the end sections and shiftingly secured to the other end section,
(e) sprocket means disposed at a location for changing the direction of movement of the conveying means along said path,
(f) the closed loop conveying means including a pair of conveyor chains each having a plurality of carrier blocks with each adjacent block being interconnected with said adjustable link means,
(g) said sprocket means being effective to synchronously move the pair of chains along said path to cause the carrier blocks of each chain to move along as a unit,
(h) each said carrier block of each unit carries a pocket section to form a pocket means for holding said article.

19. An assembly for moving an article along a path, said assembly comprising:
(a) closed loop conveying means including longitudinally self-adjustable link means,
(b) rail guide means extending along the length of the conveying means,
(c) said link means including a linking element having two end sections, bearing means mounted on each end section, and coupling means for connecting said end sections with respect to each other,
(d) said coupling means fixedly secured to one of the end sections and shiftingly secured to the other end section,
(e) sprocket means disposed at a location for changing the direction of movement of the conveying means along said path,
(f) the sprocket means including a sprocket member at each of two locations in fixed spaced relationship with respect to each other.

20. An assembly as described in claim 19, wherein said conveying means includes a closed loop conveyor and means for driving both sprocket members at both locations to free said closed loop conveyor of any driving function.

21. An assembly for moving an article along a path, said assembly comprising:
(a) closed loop conveying means including longitudinally self-adjustable link means,
(b) rail guide means extending along the length of the conveying means,
(c) said link means including a linking element having two end sections, bearing means mounted on each end section, and coupling means for connecting said end sections with respect to each other,
(d) said coupling means fixedly secured to one of the end sections and shiftingly secured to the other end section,
(e) sprocket means disposed at a location for changing the direction of movement of the conveying means along said path,
(f) the closed loop conveying means including a plurality of carrier block means having a fixed length alternately connected to said self-adjustable link means,
(g) each said carrier block means carries pocket means for containing said article,
(h) said conveying means being effective to move said article to a plurality of work stations along said path.

22. An assembly as described in claim 21, wherein sprocket means is disposed inside the closed loop of the conveying means at each of two locations in fixed spaced relationship with respect to each other,
said self-adjustable link means being expanded to its maximum length while moving around said sprocket means to maintain the pocket means in a stable, locked disposition at said sprocket means.

23. A link member longitudinally self-adjustable along a fixed longitudinal axis, said link member comprising:
(a) two separated linking element end sections having outer opposed ends and inner opposed ends,
(b) bearing means mounted only on said outer opposed ends of each end section, and
(c) coupling means fixedly secured to one of the inner opposed ends and shiftingly secured to the other inner opposed end to cause the end sections to be movable only in a direction parallel to the fixed longitudinal axis of the link member.

24. A link means as described in claim 23, wherein a sleeve means is disposed over the coupling means to contain lubricant for the coupling means.

25. A link means as described in claim 24, wherein the sleeve means is a single tubular member composed of a flexible material.

26. A link means as described in claim 25, wherein the flexible material is a lubrication proof rubber.

27. A link means as described in claim 23, wherein each end section includes an inwardly directed connector portion and
the coupling means includes two coupling members fixedly secured to one connector portion and effective to slidably contain the other connector portion.

28. A link means as described in claim 27, wherein each coupling member has an inwardly directed channel, and
each connector portion has a bearing surface section disposed in the channel.

29. A link means as described in claim 27, wherein fastening means fixedly secure the two coupling members to one connector portion, and
each coupling member has an inwardly directed channel with a stop abutment at the slidably connected end thereof,
each connector portion has a bearing surface section disposed in the channel.

30. A link means as described in claim 29, wherein the slidably connected connector portion is effective to move a delimited distance between said stop abutment and the end of said one connector portion fixedly secured to the linking means.

* * * * *